United States Patent
Raskar et al.

(10) Patent No.: US 7,252,387 B2
(45) Date of Patent: Aug. 7, 2007

(54) SYSTEM AND METHOD FOR MECHANICALLY ADJUSTING PROJECTOR POSE WITH SIX DEGREES OF FREEDOM FOR IMAGE ALIGNMENT

(75) Inventors: Ramesh Raskar, Cambridge, MA (US); Jeroen van Baar, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 290 days.

(21) Appl. No.: 11/084,876

(22) Filed: Mar. 21, 2005

(65) Prior Publication Data

US 2006/0209268 A1    Sep. 21, 2006

(51) Int. Cl.
  G03B 21/26  (2006.01)
  H04N 3/23   (2006.01)
  H04N 3/223  (2006.01)
  H04N 3/227  (2006.01)

(52) U.S. Cl. .......................... 353/69; 353/70; 353/94; 353/121; 348/746; 348/747

(58) Field of Classification Search ................ 353/69, 353/70, 94, 121; 348/745–747, 806; 345/647, 345/649, 659, 672, 689; 382/275, 289, 295–297
See application file for complete search history.

(56) References Cited

U.S. PATENT DOCUMENTS

| | | | |
|---|---|---|---|
| 5,548,357 A | 8/1996 | Appel et al. | 353/69 |
| 5,795,046 A | 8/1998 | Woo | 353/69 |
| 6,520,647 B2 | 2/2003 | Raskar | 353/70 |
| 6,527,395 B1 | 3/2003 | Raskar et al. | 353/70 |
| 6,677,956 B2 | 1/2004 | Raskar et al. | 345/581 |
| 6,781,591 B2 | 8/2004 | Raskar | 345/582 |
| 2004/0085256 A1 | 5/2004 | Hereld et al. | 345/1.1 |
| 2006/0038927 A1* | 2/2006 | Saletta | 348/745 |

OTHER PUBLICATIONS

Sukthankar et al.: "Smarter Presentations: Exploiting homography in camera-projector systems," 2001.

* cited by examiner

*Primary Examiner*—W. B. Perkey
(74) *Attorney, Agent, or Firm*—Dirk Brinkman; Clifton D. Mueller; Gennadiy Vinokur

(57) ABSTRACT

A method adjusts a pose of a projector with respect to a display surface. A homography $H_{D,P}$ is determined between a display surface and a projector. The homography $H_{D,P}$ is decomposed into rotation and translation parameters expressing a pose $M_P$ of the projector. An ideal pose $M_0$ of the projector corresponding to an ideal homography $H_0$ is determined. A pose adjustment $M_A$ is determined according to $M_A = M_0(M_P)^{-1}$. The pose adjustment $M_A$ is decomposed into rotation and translation adjustment parameters. Then, the projector is adjusted mechanically to the ideal pose $M_0$ according to the rotation and translation adjustment parameters.

14 Claims, 4 Drawing Sheets

100

200

300

400

SYSTEM AND METHOD FOR MECHANICALLY ADJUSTING PROJECTOR POSE WITH SIX DEGREES OF FREEDOM FOR IMAGE ALIGNMENT

FIELD OF THE INVENTION

This invention relates generally to image projectors, and more particularly, to correcting keystoning problems in displayed images.

BACKGROUND OF THE INVENTION

Image projectors are common. These projectors are aimed at a vertical display surface to show a "slide" presentation or a video. Many of these projectors use transmission LCDs, and typically have a single lens. The projectors can display images one at the time or as a sequence of images.

These projectors are typically designed so that undistorted images are displayed on the display surface only when an optical axis of the projector is aligned perpendicularly to a center of the display surface. If the above assumption is violated, then the resulting output image may not be rectangular, and will be, at best, a trapezoid, and at worst an arbitrary quadrilateral. This problem is called keystoning.

With prior art projectors, the one way to correct keystoning is to tediously adjust the physical position of the projector by moving it around by translating and rotating the projector until a rectangular image is displayed.

U.S. Pat. No. 5,548,357, "Keystoning and focus correction for an overhead projector," issued to Appel et al. on Aug. 18, 1998, describes a system where a test slide is displayed. A user identifies line pairs most parallel to each other. The line pair identification activates a distortion correction program that uses the oblique angle between the horizontal plane through the projector and the viewing screen.

U.S. Pat. No. 5,795,046, "Method for pre-compensating an asymmetrical picture in a projection system for displaying a picture," issued to Woo on August 1998, describes a system where the projection angle, and the trapezoidal error, is compensated for by the user entering in positional information into the system via a keyboard.

U.S. Pat. No. 6,520,647, "Automatic keystone correction for projectors with arbitrary orientation," issued to Raskar on Feb. 18, 2003, describes a method that corrects keystoning in a projector arbitrarily oriented with respect to a display surface. An elevation angle, a roll angle, and an azimuth angle of an optical axis of the projector are measured with respect to the display surface. A planar projective transformation matrix is determined from the elevation, roll, and azimuth angles. A source image to be projected by the projector is warped according to the planar projective transformation, and then projected onto the display surface.

However, digitally warping an image results in a degradation of image quality, because pixels have to be re-sampled, and some pixels are discarded.

SUMMARY OF THE INVENTION

The invention adjusts a pose of a projector with respect to a display surface. A homography $H_{D,P}$ is determined between a display surface and a projector. The homography $H_{D,P}$ is decomposed into rotation and translation parameters expressing a pose $M_P$ of the projector. An ideal pose $M_0$ of the projector corresponding to an ideal homography $H_0$ is determined. A pose adjustment $M_A$ is determined according to $M_A = M_0 (M_P)^{-1}$. The pose adjustment $M_A$ is decomposed into rotation and translation adjustment parameters. Then, the projector is adjusted mechanically to the ideal pose $M_0$ according to the rotation and translation adjustment parameters.

DETAILED DESCRIPTION OF THE PREFERRED EMBODIMENTS

Figure 1:
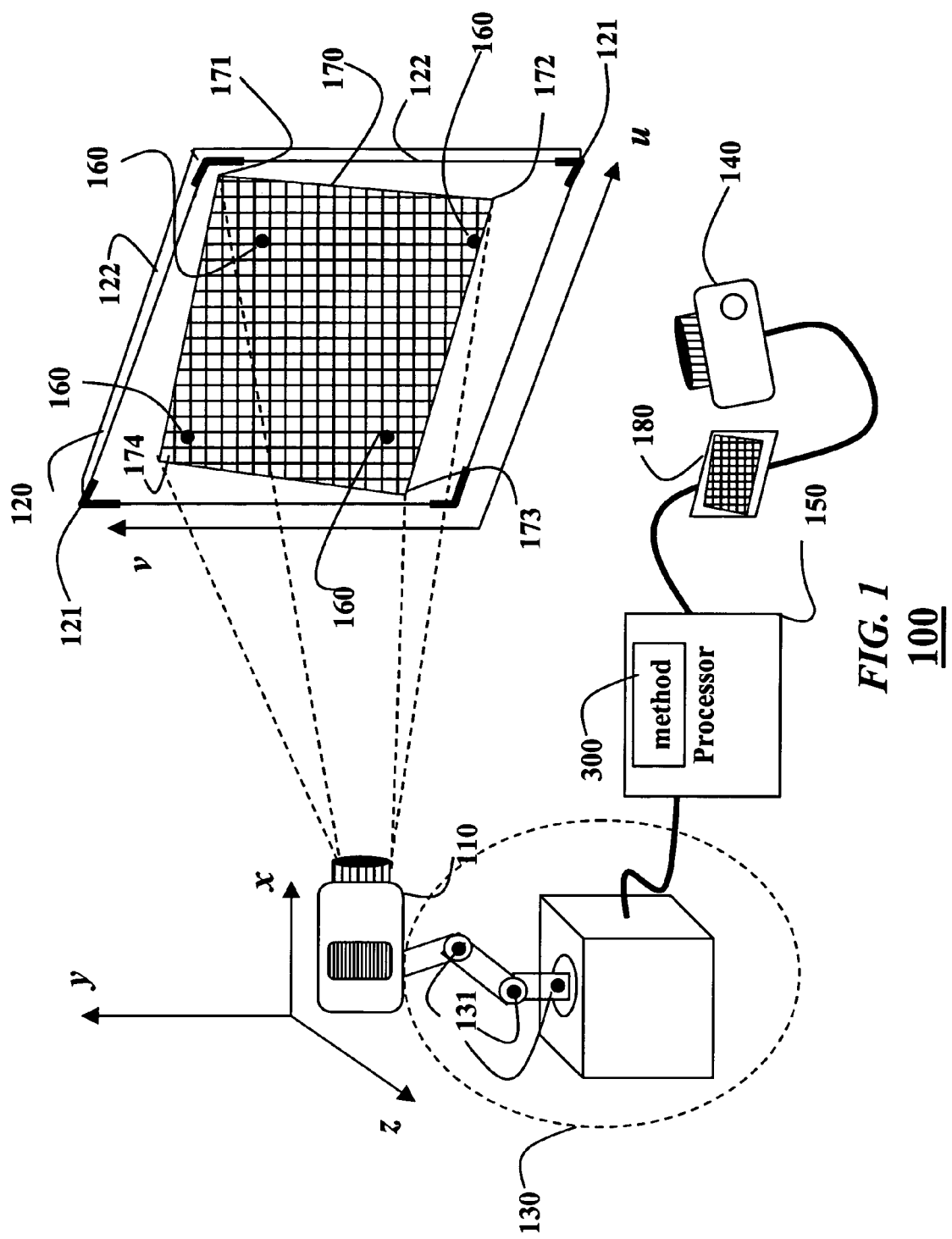
FIG. 1 is a block diagram of a projector system according to the invention.

As shown in FIG. 1, a projector display system 100 according to our invention includes a projector 110 having an arbitrary pose $M_P$ in real-world (x, y, z) coordinates, and a display surface 120 with (u, v) coordinate systems. The coordinate systems can have normalized values in the range [0, ... 1], or actual physical measurements. The aspect ratios of the projector and the display surface match substantially. By pose, we specifically mean rotation and translation around the three axes. The pose of the projector, with respect to the display surface, is arbitrary and unknown. Therefore, there is a potential keystoning problem, which the invention solves mechanically.

The system can also include optical sensors, e.g., the optical sensors are mounted in a camera 140 as a CCD grid. The projector and camera are connected to a processor 150 for performing a method 300 according to the invention. The internal parameters and radial distortions of the projector(s) and camera are known.

Alternatively, the display screen can include photosensors 160 mounted at known positions on the display surface. The photosensors are connected to the processor 150 by either a wire, a fiber optic cable, or a wireless link.

The display surface can be viewed from a front or backside. The display surface includes distinguishable features at known positions, such as corners 121, and edges 122. The projector can display an output image 170 or a sequence of images, i.e., a video. The projector is mounted on a platform 130 that allows six external degrees of freedom to result in some arbitrary pose of the projector with respect to the surface 120. Joints 131 can change the pose $M_P$ of the projector. The joints 131 may be actuated with motors.

As stated above, the output image 170 can be some arbitrary distorted quadrilateral, not necessarily aligned with the display surface. It is desired to correct this distortion so that the displayed image is rectangular and aligned with the display surface edges, without digitally warping the displayed image.

The projector 110 displays the output image in an image coordinate system. The projector has four internal degrees of freedom for performing horizontal shift, vertical shift, zoom and skew. The shifts of the image are usually performed by shifting the lens, the zoom is achieved by shifting the lens in and out, and the skew by shifting horizontally and vertically at the same time.

Figure 2:
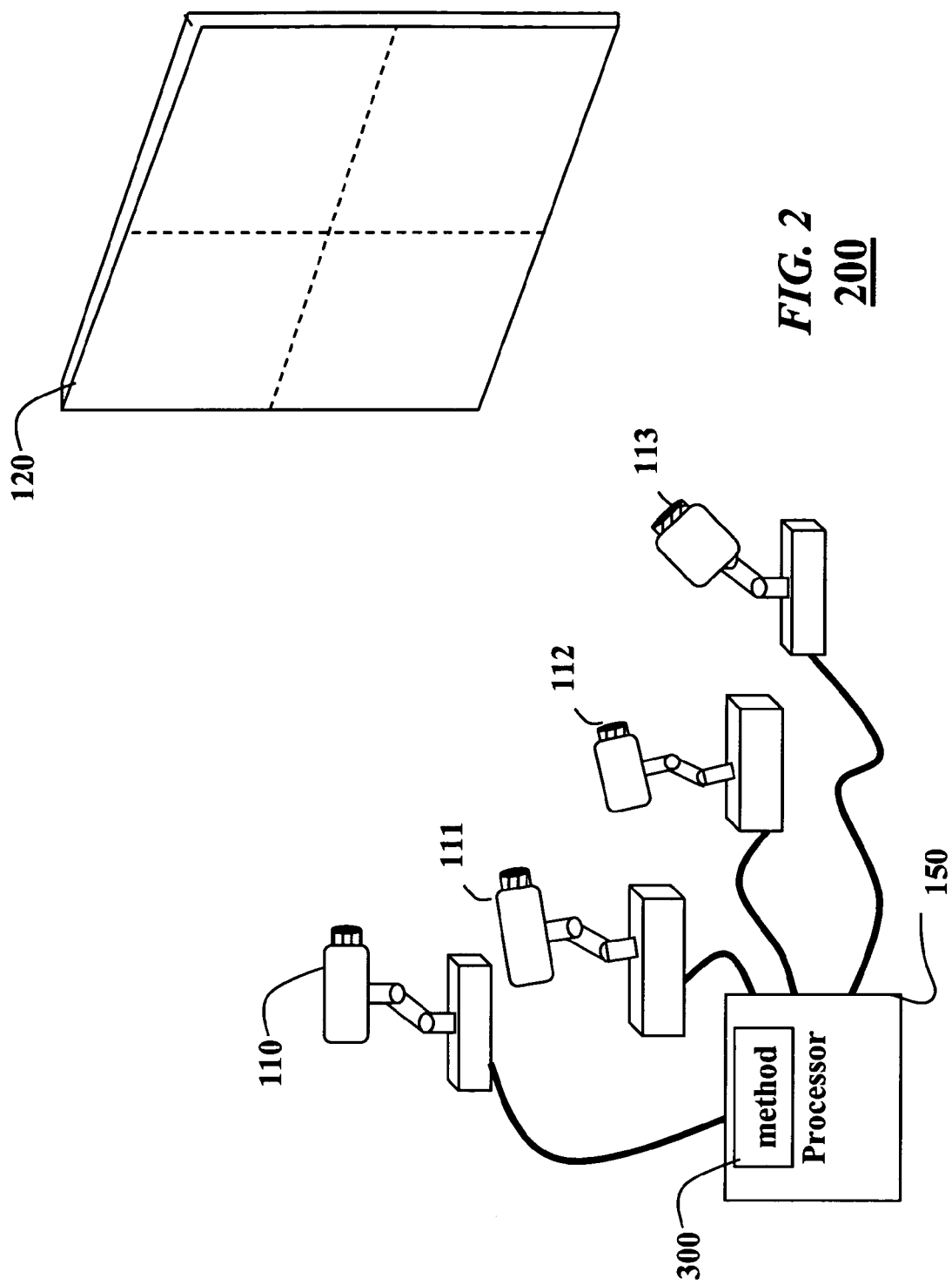
FIG. 2 is a block diagram of a multi-projector system with abutting images according to the invention.

As shown in FIG. 2, the invention can also be used with a multi-projector system 200. The images displayed by the multiple projectors 110–113 can either abut as in FIG. 2 or overlap as in FIG. 4.

Camera-Based Technique

A desired display rectangle is D. The display rectangle D can be all or part of the display surface 120. For an ideal pose $M_0$ of the projector, the output image 170 substantially matches the display surface 120, and an optical axis of the projector is aligned perpendicularly to a center of the display surface.

This can be done by a scaling, rotating, and translating the projector according to an ideal homography $H_0$. If the projector and the display surface have the same aspect ratio, then the scaling along the z-axis can be done by zooming. Translating is along the x-axis and the y-axis. Rotation can be along any axis.

Figure 3:
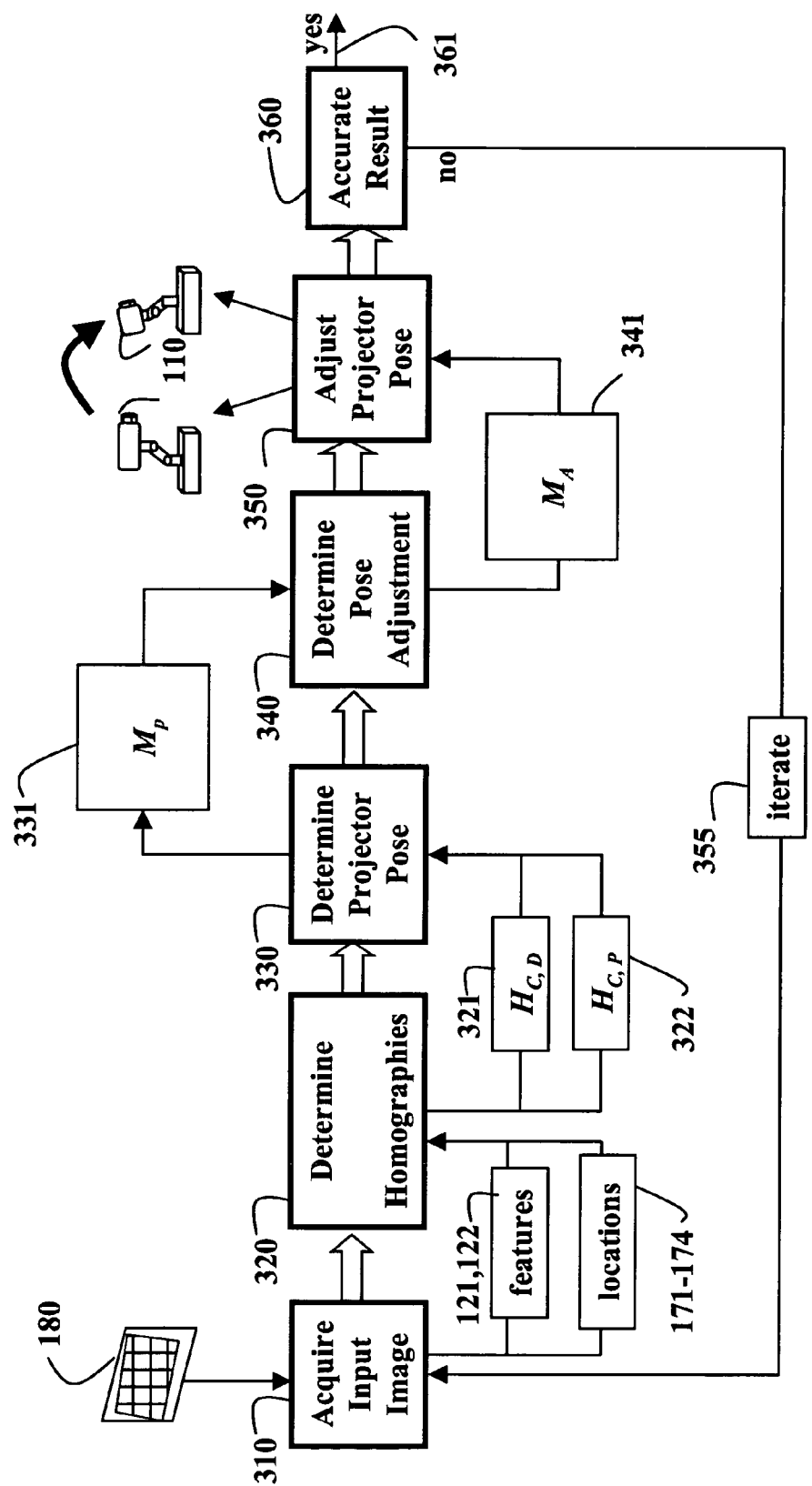
FIG. 3 is a flow diagram of a method for adjusting a pose of a projector according to the invention.

As shown in FIG. 3 for a method according to our invention, we acquire 310 an input image 180 of the display surface 120 as the output image 170 is displayed. The output image includes a distinctive pattern.

From the input image, we detect the features of the display surface, e.g., the four corners 121, or the edges 122. We also detect features in the pattern of the output image 170, including the four locations 171–174, from the input image 180. It should be understood that three features and locations are sufficient, but four improves accuracy.

Based on the detected features and locations and using conventional, well known techniques, we determine 320 a homography $H_{C,D}$ 321 between the camera and the display surface, and a homography $H_{C,P}$ 322 between the camera and the projector.

Using the homographies 321 and 322, we relate the coordinates (u, v) of the display surface to the projector coordinates (x, y) according to:

$$[wx\ wy\ w]^T = H_{D,P}[u\ v\ 1]^T = H_{C,D}(H_{C,P})^{-1}[u\ v\ 1]^T,$$

where w is the homogeneous coefficient of projective coordinates, T denotes a transpose, and $H_{D,P}$ is a homography between the display surface and the projector.

Next, we decompose the homography $H_{D,P}$ into rotation and translation parameters expressing a pose $M_P$ 331 of the projector 110 as follows. For a pinhole device, a perspective projection matrix $P_P$ projects 3D points onto a 2D image plane according to:

$$P_P = A_P[R|t] = A_P[r_1 r_2 r_3|t] = A_P M_P,$$

where $A_P$ is a 3×3 matrix including the internal parameters of the projector, i.e., focal length and a principal point, and R and t are the external parameters of the projector, and $M_P$ expresses the pose, i.e., rotation and translation of the projector. The matrix R is a 3×3 rotation matrix having columns $r_1$, $r_2$, and $r_3$ as the rotation parameters, and t is the translation parameter.

If a 3D point on the display surface is expressed in terms of the coordinate system of the projector, and R and t are expressed relative to that coordinate system, then a projection of that point from the projector onto the image plane can be expressed as:

$$[wx\ wy\ w]^T \cong A_P[r_1 r_2 r_3|t][X\ Y\ Z\ 1]^T,$$

where '≅' means defined up to scale, and X, Y, and Z are the coordinates of a point in 3D space.

We define the display surface as a plane in 3D space. Without loss of generality, we assume that the 3D plane is coplanar with Z=0, i.e., the points can be expressed as: (U, V, 0, 1)$^T$. Using these points in the above equation, yields:

$$[wx\ wy\ w]^T \cong A_P[r_1\ r_2\ r_3\ |t][U\ V\ 0\ 1]^T$$
$$\cong A_P[r_1\ r_2\ |t][U\ V\ 1]^T$$
$$\cong H_{D,P}[U\ V\ 1]^T$$

In other words, we have $H_{D,P} = A_P[r_1\ r_2|t]$. Given that we know the matrix $A_P$, we have:

$$(A_P)^{-1}H_{D,P} = (A_P)^{-1}A_P[r_1 r_2|t] = [r_1 r_2|t],$$

and $r_3$ can be determined from $r_1 \times r_2$.

Alternatively, we can determine a best orthogonal matrix to find the rotation parameters $r_1$, $r_2$, $r_3$. This is all the information we need to determine 330 the pose $M_P = [r_1\ r_2\ r_3|t]$ 331 of the projector in terms of the rotation and translation parameters.

For the ideal pose $M_0$, the homography is $H_0$. Knowing the internal parameters $A_P$ of the projector, we can determine the ideal pose $M_0$ for the projector to display a rectangle with a homography $H_0$ between the projector and the display surface. The ideal pose is:

$$M_0 = (A_P)^{-1}H_0.$$

Knowing the arbitrary pose $M_P$, we determine a rotation and translation adjustment $M_A$ 341 to transform the arbitrary pose $M_P$ to the ideal pose $M_0$. With $M_0 = M_A M_P$, i.e., we determine 340 $M_A = M_0(M_P)^{-1}$.

We decompose $M_A$ into rotation angles and translation parameters for the motorized joints 131 to directly adjust 350 the projector 110 mounted on the six degrees of freedom platform 130 using the motorized joints 131.

At this point, another input image can be acquired to verify 360 the accuracy of the adjustment, and the steps 310, 320, 330, and 340 can be iterated 355 until a result with a desired accuracy is achieved 361.

Photo Sensor-Based Technique

Instead of the camera 140, we can use the photosensors 160 mounted at known positions on the display screen 120.

An extent of the displayed output image 170 covers all the photosensors. Although three sensors are sufficient to determine the homographies 321 and 322, we use four to improve the accuracy of the result.

As with the camera-based technique described above, we detect four locations in the output image 170 using the sensors 160, see U.S. patent application Ser. No. 10/635,404, "Method and System for Calibrating Projectors to Arbitrarily Shaped Surfaces with Discrete Optical Sensors," filed by Lee et al. on Aug. 6, 2003 and incorporated herein by reference.

That is, we illuminate the photosensors with a sequence of so-called binary coded patterns using the projector. The binary coded patterns contain alternate black and white segments. We illuminate once with a horizontal sequence, and once with a vertical sequence. During the sequence of projections, the photosensors record whether white segments (high intensity) or black segments (low intensity) were detected. As a result, we obtain a binary number sequence for the horizontal and vertical sequences. The binary number sequences encode the locations of the pixels of the projector.

Then, we apply the method 300 as described above to determine the homographies, and process accordingly.

Multi-Projector Displays

Figure 4:
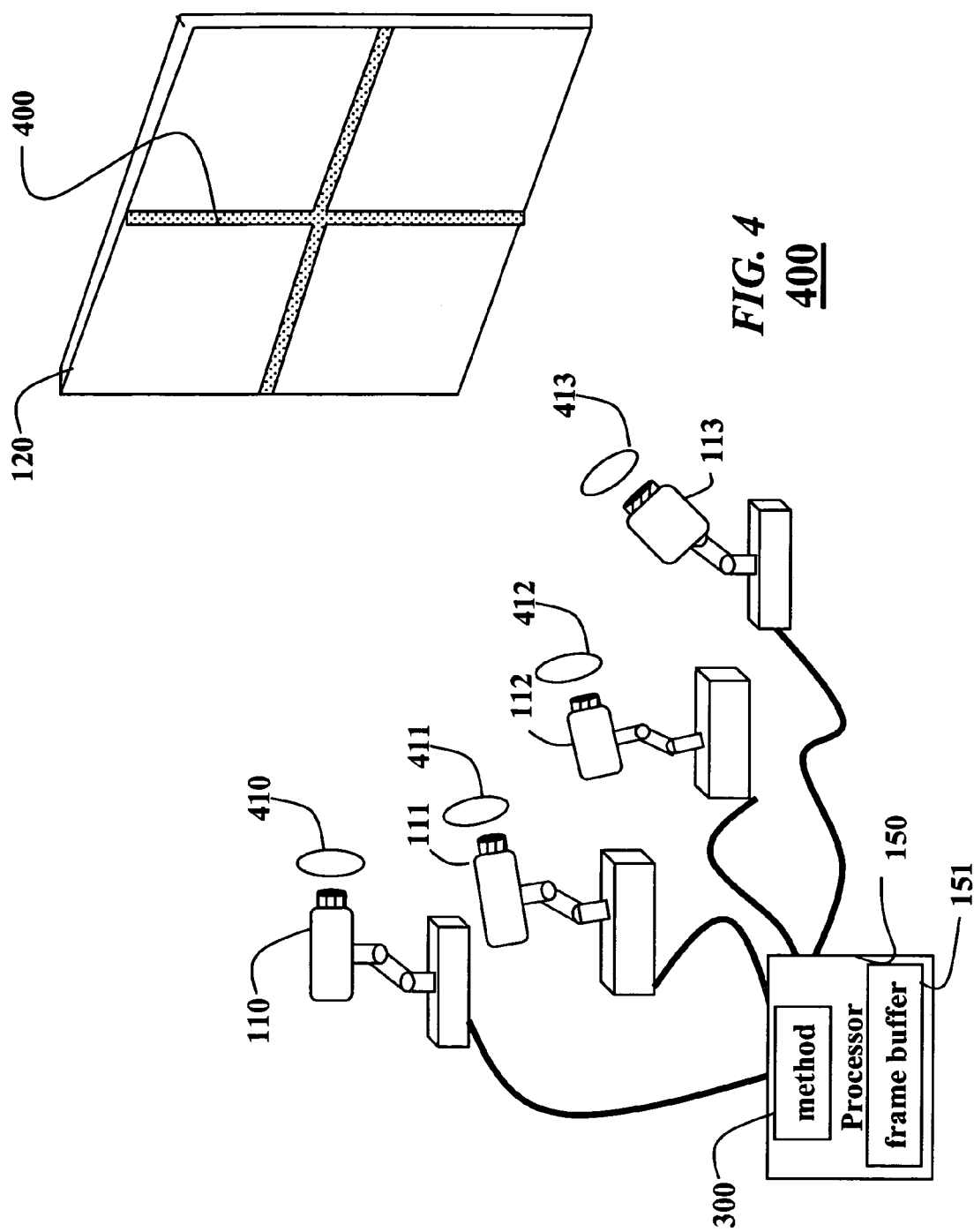
FIG. 4 is a block diagram of a multi-projector system with overlapping images according to the invention.

In the case of multi-projector display systems, we distinguish between two cases: the output images abut as shown in FIG. 2, and the output images overlap as shown in FIG. 4.

If the output images abut as in FIG. 2, then the rectangle associated with each output images is predefined, and we can apply the method 300 for each projector, independently.

In the case of overlapping output images as in FIG. 4, we adjust for an increase in brightness in the overlapping regions 400. This can be done in two ways.

First, we can digitally modify the pixels intensities in a frame buffer 151 for the projector, see U.S. Pat. No. 6,677,956 and U.S. Pat. No. 6,781,591 incorporated herein by reference.

Second, intensity reducing filters 410–413 can be placed in placed in front of the lens of each respective camera. For the second technique, the desired display rectangles are predetermined, and the filters are designed accordingly. For example, some regions of the output images overlap with only one adjacent image, whereas other regions overlap with multiple output images.

As an advantage, the optical filters modify pixel intensities so that the black level in the overlap regions is the same as the black level in regions without overlap. In the prior art, such filters have been used in multi-projector flight simulator systems. The filters can also be mounted on six degrees of freedom platforms to correctly align the filter to produce the desired shadows.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A computer implemented method for adjusting a pose of a projector with respect of a display surface, comprising:
    determining a homography $H_{D,P}$ between a display surface and a projector;
    decomposing the homography $H_{D,P}$ into rotation and translation parameters expressing a pose $M_P$ of the projector;
    determining an ideal pose $M_0$ of the projector corresponding to an ideal homography $H_0$;
    determining a pose adjustment $M_A$ according to $M_A = M_0 (M_P)^{-1}$;
    decomposing the pose adjustment $M_A$ into rotation and translation adjustment parameters; and
    adjusting mechanically the projector to the ideal pose $M_0$ according to the rotation and translation adjustment parameters.

2. The method of claim 1, in which the projector is mounted on a six degree of freedom platform, including motorized joints, and further comprising:
    providing the rotation and translation adjustment parameters to the motorized joints to adjust the projector to the ideal pose $M_0$.

3. The method of claim 1, in which the optical sensors are mounted in a camera, and further comprising:
    displaying an output image on a display surface with the projector, the display surface having detectable features at known positions, and the output image including a predetermined pattern at known locations;
    acquiring an input image of the display surface and the output image;
    detecting the features and the locations in the input image;
    determining the homography $H_{C,D}$ between the camera and the display surface and a homography $H_{C,P}$ between the camera and the projector from the features and locations; and
    determining the homography $H_{D,P}$ from the homographies $H_{C,D}$ and $H_{C,P}$.

4. The method of claim 1, in which the optical sensors are photosensors mounted at known position on the display surface, and further comprising:
    displaying a sequence of output images on the display surface with the projector, the sequence of output image including predetermined patterns at known locations;
    detecting the features and the locations from the sequence of output images using the photosensors; and
    determining the homography $H_{D,P}$ from the features the features and location in the sequence of output images using the photosensors.

5. The method of claim 1, in the ideal pose is according to $M0 = (A_P)^{-1} H_0$, where $A_P$ is a matrix including internal parameters of the projector.

6. The method of claim 1, in which the display surface is viewed from a front side.

7. The method of claim 1, in which the display surface is viewed from a back side.

8. The method of claim 1, in which there is a plurality of projectors displaying abutting images, and each projector is adjusted independently.

9. The method of claims 3 and 4, further comprising:
    relating coordinates (u, v) of the display surface to coordinates (x, y) of the projector coordinates according to:

$$[wx\ wy\ w]^T = H_{D,P}[u\ v\ 1]^T = H_{C,D}(H_{C,P})^{-1}[u\ v\ 1]^T,$$

where w is the homogeneous coefficient of projective coordinates, T denotes a transpose, and a perspective projection matrix $P_P$ projects 3D points onto a 2D image plane according to:

$$P_P = A_P[R|t] = A_P[r_1 r_2 r_3 | t] = A_P M_P,$$

where $A_P$ is a 3×3 matrix including internal parameters of the projector and a principal point, and R and t are external parameters of the projector, the matrix R is a 3×3 rotation matrix having columns $r_1$, $r_2$, and $r_3$ as the rotation parameters, and t is the translation parameter.

10. The method of claim 9, in which the ideal pose $M_0$ is $M_0 = (A_P)^{-1} H_0$, and $M_0 = M_A M_P$, and $M_A = M_0 (M_P)^{-1}$.

11. The method of claim 1, in which there is a plurality of projectors displaying overlapping images, and further comprising:
    adjusting for an increase in brightness in overlapping region.

12. The method of claim 11, in which the intensity adjusting is performed digitally in a frame buffer of the projector.

13. The method of claim 11, in which the intensity adjusting is performed optically with intensity reducing filters.

14. An apparatus for a pose of a projector with respect of a display surface, comprising:
    a six degree of freedom platform including motorized joints;
    a projector mounted on the six degree of freedom platform;
    a display surface;
    means for determining a homography $H_{D,P}$ between the display surface and the projector;

means for decomposing the homography $H_{D,P}$ into rotation and translation parameters expressing a pose $M_P$ of the projector;

means for determining an ideal pose $M_0$ of the projector corresponding to an ideal homography $H_0$;

means for determining a pose adjustment $M_A$ according to $M_A = M_0 (M_P)^{-1}$;

means for decomposing the pose adjustment $M_A$ into rotation and translation adjustment parameters; and means for providing the rotation and translation adjustment parameters to the motors to adjust the projector to the ideal pose $M_0$.

* * * * *